US012572860B2

(12) United States Patent
Stephens et al.

(10) Patent No.: US 12,572,860 B2
(45) Date of Patent: Mar. 10, 2026

(54) EXTRACTION OF ACTIONABLE INSIGHTS THROUGH ANALYSIS OF UNSTRUCTURED COMPUTER TEXT

(71) Applicant: FMR LLC, Boston, MA (US)

(72) Inventors: Eric Stephens, Baldwinsville, NY (US); Michael Boyer, Keller, TX (US); Boris Kalinichenko, Jamaica Plain, MA (US)

(73) Assignee: FMR LLC, Boston, MA (US)

( * ) Notice: Subject to any disclaimer, the term of this patent is extended or adjusted under 35 U.S.C. 154(b) by 102 days.

(21) Appl. No.: 18/214,645

(22) Filed: Jun. 27, 2023

(65) Prior Publication Data

US 2025/0005467 A1     Jan. 2, 2025

(51) Int. Cl.
*G06Q 10/06*     (2023.01)
*G06F 16/353*     (2025.01)
*G06Q 10/0631*     (2023.01)

(52) U.S. Cl.
CPC ...   *G06Q 10/063112* (2013.01); *G06F 16/353* (2019.01); *G06Q 10/063116* (2013.01)

(58) Field of Classification Search
CPC ........................................ G06Q 10/00–90/00
See application file for complete search history.

(56) References Cited

U.S. PATENT DOCUMENTS 8,539,359 B2    9/2013   Rapaport et al.
9,413,891 B2    8/2016   Dwyer et al.

10,608,968 B2    3/2020   Higgins et al.
10,977,293 B2    4/2021   Cai et al.
11,489,793 B2    11/2022  Bastide et al.
2010/0296641 A1  11/2010  Goel et al.
2015/0066554 A1*  3/2015  Red ................ G06Q 10/063112
                                                    705/7.14

(Continued)

OTHER PUBLICATIONS

S. Ontoum and J.H. Chan, "Personality Type Based on Myers-Briggs Type Indicator with Text Posting Style by using Traditional and Deep Learning," arXiv:2201.08717v1 [cs.CL] Jan. 21, 2022, available at https://arxiv.org/pdf/2201.08717.pdf, 10 pages.

(Continued)

*Primary Examiner* — Arif Ullah
(74) *Attorney, Agent, or Firm* — Cesari and McKenna, LLP

(57)         ABSTRACT

Methods and apparatuses are described in which unstructured computer text is analyzed for extraction of actionable insights in a computing environment. A server executes a machine learning classification model on text messages exchanged between users to classify each text message according to a disposition and a theme. The server analyzes the classified messages to generate candidate work items, each associated with software applications and skills requirements. The server filters the candidate items to remove extraneous items based upon a work item backlog or a prioritization. The server determines team members to assign to each remaining candidate item by comparing the software applications and the skills requirements for the work item to a profile for each team member. The server creates a task for each remaining candidate item, the task including the assigned team members. The server generates a notification for each task for transmission to the assigned team members.

18 Claims, 8 Drawing Sheets

100

(56)                         References Cited

U.S. PATENT DOCUMENTS

| | | | |
|---|---|---|---|
| 2016/0335583 A1* | 11/2016 | Suntinger | G06Q 10/063114 |
| 2019/0268214 A1 | 8/2019 | Maes et al. | |
| 2020/0177403 A1* | 6/2020 | Vazquez-Rivera | G06Q 10/10 |
| 2020/0202268 A1 | 6/2020 | Retna et al. | |
| 2021/0280078 A1* | 9/2021 | Quan | G16H 50/70 |
| 2021/0295237 A1* | 9/2021 | Taher | G06Q 10/063112 |
| 2023/0306324 A1* | 9/2023 | Terner | G06Q 10/06311 |

OTHER PUBLICATIONS

K.P. Sinaga and M. Yang, "Unsupervised K-Means Clustering Algorithm," IEEE Access, vol. 8, published Apr. 20, 2020, pp. 80716-80727.

* cited by examiner

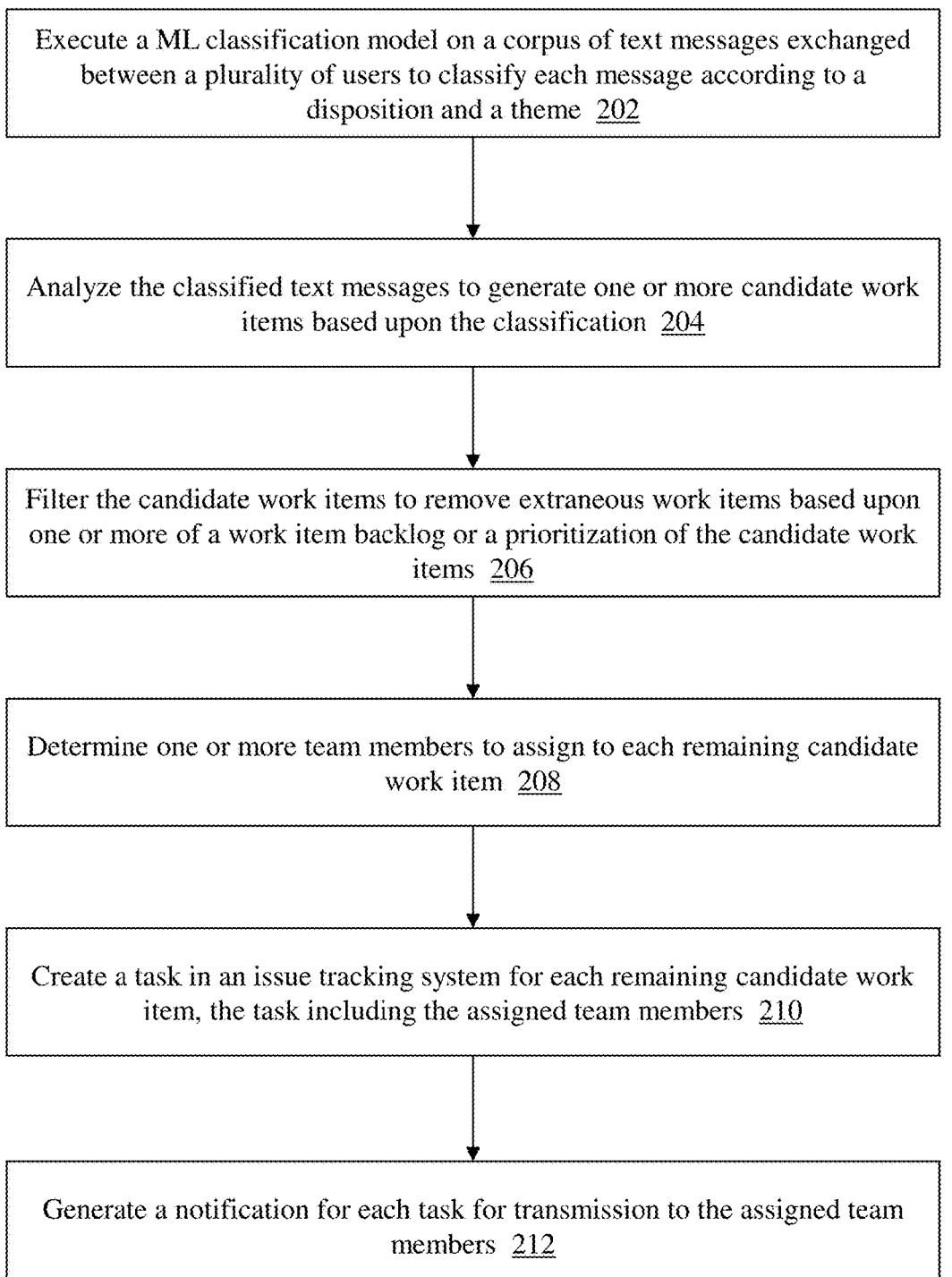

Execute a ML classification model on a corpus of text messages exchanged between a plurality of users to classify each message according to a disposition and a theme 202

Analyze the classified text messages to generate one or more candidate work items based upon the classification 204

Filter the candidate work items to remove extraneous work items based upon one or more of a work item backlog or a prioritization of the candidate work items 206

Determine one or more team members to assign to each remaining candidate work item 208

Create a task in an issue tracking system for each remaining candidate work item, the task including the assigned team members 210

Generate a notification for each task for transmission to the assigned team members 212

EXTRACTION OF ACTIONABLE INSIGHTS THROUGH ANALYSIS OF UNSTRUCTURED COMPUTER TEXT

TECHNICAL FIELD

This application relates generally to methods and apparatuses, including computer program products, for extraction of actionable insights through analysis of unstructured computer text.

BACKGROUND

Software development project management generally relates to creating and managing a development timeline, and coordinating appropriate resources (e.g., assigning software developers to specific tasks), that result in completion of a software development project. One approach to software development project management is the use of an Agile™ development framework. Agile is characterized by the utilization of quick, efficient development periods (called sprints), at the end of which one or more deliverables are created and then further sprints are adapted in response to changing development needs and objectives. Generally, Agile development provides that a project can be organized into one or more segments with each segment being broken down into a plurality of 'stories'—each story defining a particular piece of functionality in the segment. Stories typically include a description of the required functionality, acceptance criteria, story points (i.e., estimation of effort), start time, end time, creator, assignee (i.e., developer(s) that will work on the story), and so forth. The difference between the start time and the end time of the story is understood as the cycle time—that is, the total elapsed time including process time (during which a unit of work is acted upon to bring the story closer to an output) and delay time (during which a unit of work is used waiting to take the next action). Each story can be further partitioned into tasks. Typically, each sprint involves a developer or a team of developers conducting a full development cycle including planning, designing, coding, and quality assurance/testing phases.

The Agile development process also includes certain practices and ceremonies to enable continued efficient and productive development activity. One of the ceremonies conducted by Agile work teams is the retrospective which occurs after a sprint or significant event. During the retrospective, participants typically reflect on three key items: 1) what worked, 2) what could have gone better, and 3) what the team should do about it. The retrospective usually occurs immediately after the sprint is concluded. The team's ability to reflect on the key items is facilitated by the proximity of the retrospective to the sprint.

However, the structured nature of the Agile development process can run into conflict with the dynamic and reactive nature of software development, particularly with respect to unanticipated development tasks, such as, but not limited to, cybersecurity incidents. For example, there may be instances where critical vulnerabilities in the software (e.g., security flaws, virus attacks) are detected. Existing, ongoing development work must be put on hold in order to remediate these critical vulnerabilities as soon as possible. This can cause a delay in conducting Agile ceremonies (i.e., retrospectives at the end of each sprint, etc.) for ongoing development work. In addition, the typical Agile ceremonies may not be followed for the unit of work encapsulating the critical vulnerability remediation. As a result, the key findings and ideas for improvement of the future development process are often lost or incorrectly memorialized—which leads to inefficiencies and loss of productivity in ensuing Agile development projects and tasks.

SUMMARY

Therefore, what is needed are methods and systems that automatically capture communications (e.g., chat messages) exchanged between team members during a period of development or cybersecurity response activity and utilize advanced machine learning techniques to analyze and classify the communications, which results in generation of development work items for future work periods and assignment of team members to the work items. The techniques described herein advantageously captures and extracts key findings out of raw chat streams to accelerate the post-event retrospective process. In addition, sentiment and semantics of the messages are factored into the selection and assignment of team members to work items that are dynamically generated from the communication messages.

The invention, in one aspect, features a system in which unstructured computer text is analyzed for extraction of actionable insights in a computing environment. The system includes a server computing device having a memory for storing computer-executable instructions and a processor that executes the computer-executable instructions. The server computing device executes a machine learning classification model on a corpus of text messages exchanged between a plurality of users to classify each text message according to a disposition and a theme, the classification model trained on historical text message classification data. The server computing device analyzes the classified text messages to generate one or more candidate work items based upon the classification, each candidate work item associated with one or more software applications and a set of skills requirements. The server computing device filters the candidate work items to remove extraneous work items based upon one or more of a work item backlog or a prioritization of the candidate work items. The server computing device determines one or more team members to assign to each remaining candidate work item by comparing the one or more software applications and the set of skills requirements for the candidate work item to a profile for each team member. The server computing device creates a task in an issue tracking system for each remaining candidate work item, the task including the assigned team members. The server computing device generates a notification for each task for transmission to the assigned team members.

The invention, in another aspect, features a computerized method in which unstructured computer text is analyzed for extraction of actionable insights in a computing environment. A server computing device executes a machine learning classification model on a corpus of text messages exchanged between a plurality of users to classify each text message according to a disposition and a theme, the classification model trained on historical text message classification data. The server computing device analyzes the classified text messages to generate one or more candidate work items based upon the classification, each candidate work item associated with one or more software applications and a set of skills requirements. The server computing device filters the candidate work items to remove extraneous work items based upon one or more of a work item backlog or a prioritization of the candidate work items. The server computing device determines one or more team members to assign to each remaining candidate work item by comparing the one or more software applications and the set of skills requirements for the candidate work item to a profile for each team member. The server computing device creates a task in an issue tracking system for each remaining candidate work item, the task including the assigned team members. The server computing device generates a notification for each task for transmission to the assigned team members.

Any of the above aspects can include one or more of the following features. In some embodiments, the corpus of text messages is received in real time from one or more ongoing text chat sessions. In some embodiments, analyzing the classified text messages comprises determining one or more of a sentiment associated with the text message or a semantic context associated with the text message. In some embodiments, determining one or more team members to assign to each remaining candidate work item further comprises selecting one or more team members based upon the sentiment associated with the text message or the semantic context associated with the text message. In some embodiments, the server computing device connects the determined team members to at least one of the ongoing chat sessions from which the candidate work item was generated. In some embodiments, the server computing device escalates at least one of the ongoing chat sessions to the determined team members.

In some embodiments, determining one or more team members to assign to each remaining candidate work item further comprises identifying one or more team members with a capacity to handle one or more candidate work items. In some embodiments, filtering the candidate work items to remove extraneous work items based upon a work item backlog comprises determining that one or more of the candidate work items is already included in the work item backlog, and removing the determined candidate work items as extraneous work items.

In some embodiments, filtering the candidate work items to remove extraneous work items based upon a prioritization of the candidate work items comprises determining a reputation associated with a chat participant that submitted each text message, and prioritizing the candidate work items according to the reputation associated with the chat participant that submitted the text messages which generated the candidate work items. In some embodiments, the server computing device transmits the notification for each task to a computing device associated with each of the assigned team members.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 2 is a flow diagram of a computerized method in which unstructured computer text is analyzed for extraction of actionable insights in a computing environment.

FIG. 5 is a diagram of an exemplary API call and corresponding output data as utilized by message analysis module to capture chat messages.

DETAILED DESCRIPTION

Figure 1:
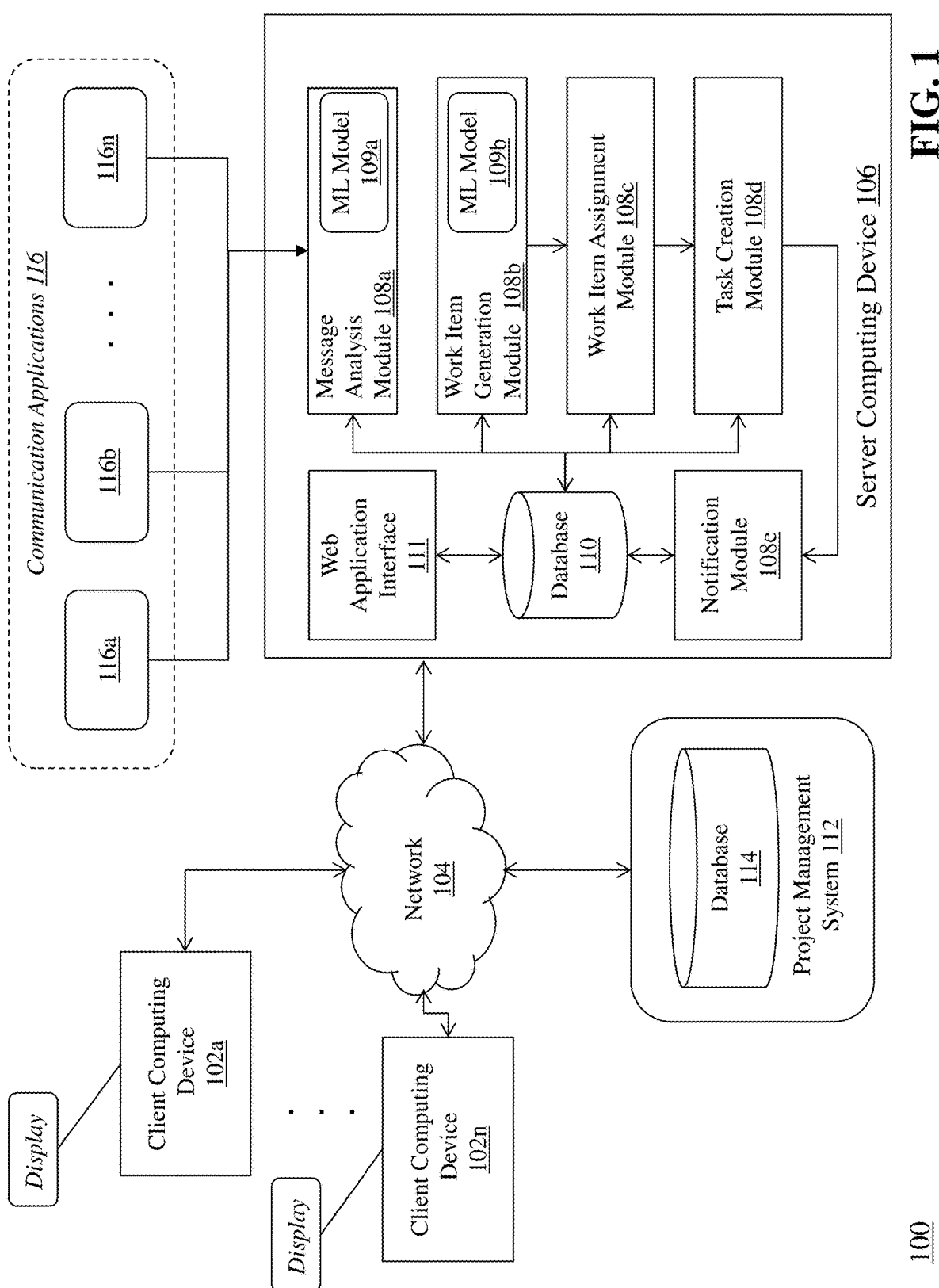
FIG. 1 is a block diagram of a system in which unstructured computer text is analyzed for extraction of actionable insights in a computing environment.

FIG. 1 is a block diagram of system 100 in which unstructured computer text is analyzed for extraction of actionable insights in a computing environment. System 100 includes client computing devices 102a-102n, communications network 104, server computing device 106 that includes message analysis module 108a with machine learning (ML) classification model 109, work item generation module 108b, work item assignment module 108c, task creation module 108d, notification module 108e, database 110, web application interface 111, project management computing system 112 coupled to network 104 that includes database 114 for storing, e.g., project management data for one or more in-development software projects, and a plurality of messaging applications 116a-116n (collectively, 116) coupled to server computing device 106.

Client computing devices 102a-102n connects to communications network 104 in order to communicate with server computing device 106 and project management system 112 to provide input and receive output relating to the process of analyzing unstructured computer text for extraction of actionable insights as described herein. In some embodiments, client computing devices 102a-102n are each coupled to a display device (e.g., a monitor or screen). For example, client computing devices 102a-102n can provide a graphical user interface (GUI) via the display device that presents output resulting from the methods and systems described herein.

Exemplary client computing devices 102a-102n include but are not limited to desktop computers, laptop computers, tablets, mobile devices, smartphones, and internet appliances. It should be appreciated that other types of computing devices that are capable of connecting to the components of system 100 can be used without departing from the scope of invention. Although FIG. 1 depicts two client computing devices 102a-102n, it should be appreciated that system 100 can include any number of client computing devices.

Communications network 104 enables client computing devices 102a-102n, server computing device 106 and project management system 112 to communicate with each other. Network 104 is typically a wide area network, such as the Internet and/or a cellular network. In some embodiments, network 104 is comprised of several discrete networks and/or sub-networks (e.g., cellular to Internet).

Server computing device 106 is a device including specialized hardware and/or software modules that execute on one or more processors and interact with memory modules of server computing device 106, to receive data from other components of system 100, transmit data to other components of system 100, and perform functions for analyzing unstructured computer text for extraction of actionable insights as described herein. Server computing device 106 includes several computing modules 108*a*-108*e* that execute on one or more processors of server computing device 106. In some embodiments, modules 108*a*-108*e* are specialized sets of computer software instructions programmed onto one or more dedicated processors in server computing device 106 and can include specifically designated memory locations and/or registers for executing the specialized computer software instructions.

Although modules 108*a*-108*e* are shown in FIG. 1 as executing within the same server computing device 106, in some embodiments the functionality of modules 108*a*-108*e* can be distributed among a plurality of server computing devices. As shown in FIG. 1, server computing device 106 enables modules 108*a*-108*e* to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. The exemplary functionality of modules 108*a*-108*f* is described in detail throughout the specification.

Message analysis module 108*a* includes machine learning (ML) classification model 109. ML model 109 is a trained machine learning (ML) algorithm that receives input from one or more communication applications 116*a*-116*n* and analyzes the input to generate corresponding output, i.e., a classification and/or label of the input according to a particular framework. An example of such ML processing is the classification/labeling of chat messages according to a disposition and a theme. In this example, ML model 109 is trained on historical chat messages that are labeled with a known disposition and theme. Then, when an unlabeled chat message is provided to ML model 109 as input, the model can analyze the message and generate a classification for the message. In this context, the disposition relates to an outcome of a task or action item associated with the message (i.e., what went well, what could have gone better, what can be done to improve future outcomes) and a theme (i.e., a subject area or topic associated with the message). In some embodiments, ML model 109 also generates a confidence level associated with the classification. For example, ML model 109 may encounter content or semantics in an input message that it is unable to properly analyze and/or classify (e.g., if the model was not trained on sufficient examples of that type of content). In these cases, ML model 109 may still be able to generate a classification value but also determine that a confidence level associated with the classification value is low. Conversely, when ML model 109 analyzes a message and is able to generate a corresponding classification with a high degree of certainty, the model can return a high confidence level.

Server computing device 106 also includes database 110. Database 110 comprises transient and/or persistent memory for data storage, that is used in conjunction with the process of analyzing unstructured computer text for extraction of actionable insights as described herein. It should be appreciated that, in some embodiments, database 110 comprises a separate computing device (or in some embodiments, a plurality of separate computing devices) coupled to server computing device 106. Database 110 is configured to receive, generate, and store specific segments of data as described herein. For example, database 110 can comprise one or more relational or non-relational databases configured to store portions of data used by the other components of system 100. Further detail regarding the operation of database 110 is provided below.

Server computing device 106 also includes web application interface 111. Web application interface 111 is a hardware and/or software module that interacts with client computing devices 102*a*-102*n* (e.g., via browser software) to handle incoming requests (e.g., via HTTP) and to serve related content to the client computing devices 102*a*-102*n*. For example, a user at client computing devices 102*a*-102*n* can open a browser and type in a URL that points to particular content (such as project management information, work items, tasks, etc.) generated by module 108*a*-108*e*. Client computing devices 102*a*-102*n* establish a connection with server computing device 106 via communications network 104 and web application interface 111 provides the requested content via one or more graphical user interface (GUI) screens.

Project management computing system 112 is a computing device (or in some embodiments, a set of computing devices) coupled to server computing device 106 via network 104 and is configured to receive, generate, store, and make available specific segments of data relating to the process of analyzing unstructured computer text for extraction of actionable insights as described herein. In some embodiments, project management computing system 112 is a JIRA™-based computing platform that enables developers to enter, save, update, and remove, e.g., stories, tasks, and the like (via a user interface provided by client computing device 102) for one or more ongoing software development projects. Project management computing system 112 includes database 114 for storing project management data, among other things, including both historical project data and current project data. In some embodiments, all of or at least a portion of database 114 can be integrated with project management computing system 112 or be located on a separate computing device or devices. Project management computing system 112 can transmit the data to other downstream computing systems or applications, such as specific project management or workforce analysis tools (e.g., JiraAlign™ available from Atlassian Corp. Plc of Sydney, Australia; AgilityHealth® available from AgilityHealth of Omaha, NE).

Messaging applications 116*a*-116*n* comprise a plurality of user communication-related software applications deployed on one or more computing devices (such as remote computing devices, web application servers, and/or other server computing devices) communicatively coupled to server computing device 106. In some embodiments, each application 116*a*-116*n* communicates with server computing device 106 via a separate application programming interface (API). As can be appreciated, server computing device 106 can retrieve data from applications 116*a*-116*n* by issuing one or more calls to the application using the corresponding API. Exemplary messaging applications 116*a*-116*n* can include, but are not limited to, instant messaging, conferencing, and collaboration platforms such as Slack™ (available from Slack Technologies, LLC) and Microsoft® Teams™ (available from Microsoft Corp.).

FIG. 2 is a flow diagram of a computerized method 200 in which unstructured computer text is analyzed for extraction of actionable insights in a computing environment, using system 100 of FIG. 1. Message analysis module 108*a* of server computing device 106 receives message data from a plurality of communication applications 116*a*-116*n*. In some embodiments, the retrieved data includes chat messages exchanged between users during a communication session, as well as metadata associated with the communication session (e.g., participant IDs, channel IDs, message timestamps, etc.). As can be appreciated, in some instances such data and metadata may be stored in different formats and/or managed by different entities. In some embodiments, message analysis module 108a comprises an Extract-Transform-Load (ETL)-based data retrieval tool that manages retrieval and processing of data/metadata from the applications 116a-116n into a format or structure that is ingestible by message analysis module 108a and ML model 109. In some embodiments, message analysis module 108a captures the message data from one or more of the communication applications 116a-116n in real time (i.e., as the exchange of messages is occurring in the applications). In some embodiments, message analysis module 108a captures the message data from one or more of the communication applications 116a-116n asynchronously from when the exchange of messages is occurring in the applications.

Upon receiving a corpus of text messages from communication applications 116a-116n, message analysis module 108a executes (step 202) ML classification model 109 using the corpus of text messages as input to classify each text message according to a disposition and a theme. As mentioned previously, ML model 109 is pre-trained on historical text message data that is, e.g., analyzed by a human user and labeled according to a known disposition and theme. The labeled data is then provided to ML model 109 during a training phase to enable ML model 109 to use one or more ML algorithms (e.g., neural network) to generate machine-readable characteristics of an incoming text message, compare those characteristics to characteristics of historical messages, and classify the incoming text message with a disposition and a theme that has been assigned to one or more historical text messages with similar machine-readable characteristics. In some embodiments, message analysis module 108a and ML model 109 are configured to cluster incoming text messages together and classify the clusters of text messages. For example, message analysis module 108a can determine that a plurality of text messages are exchanged in a given communication channel, indicating that the messages are related to the same topic or issue. Module 108a can aggregate the messages in a machine-readable format (e.g., a vector) and provide the aggregation to ML model 109a for classification.

Generally, ML model 109a generates a disposition and a theme for each incoming text message. As discussed above, in this context the disposition relates to an outcome of a task or action item associated with the message (i.e., what went well, what could have gone better, what can be done to improve future outcomes) and the theme relates to a subject area or topic associated with the message. Based upon elements such as the sentiment expressed in the text message and/or the semantic context associated with the text message, ML model 109a can classify the message with a disposition and theme. For example, messages with positive sentiment can indicate a successful disposition of the related task while messages with negative sentiment can indicate an unsuccessful disposition of the related task. In another example, messages that comprise words associated with a given domain (e.g., technical terms), involve specific participants, and/or are received from a specific communication channel (e.g., a developer chat) can be associated with a defined theme. In this case, the theme can be any of a number of different categories that reflect a subject or topic of the messages. As just one example, the theme can correspond to or otherwise be associated with one or more issue tracking categories in, e.g., project management system 112. Further details about how the disposition and theme are used to generate work items is provided below.

As used herein, a 'disposition' represents a classification dimension of the unstructured text. For example, within Agile methodologies, one of the ceremonies is the retrospective ceremony. In this ceremony, participants typically review a particular project and determine "what went well," "what could be better," and "what are we going to do about it"—which are the dispositions. As used herein, a 'theme' represents another classification dimension where unstructured messages are assigned a category which aids the software engineer or project manager/Scrum master in organizing the work. For example, a cybersecurity incident may yield any number of unstructured messages resulting in actionable insights. Those actionable insights may be categorized into themes such as: Dependency Management, Incident Response, or Technical Debt Management. Other themes, often used within Information Technology (IT) projects, are People, Process, and Technologies.

After ML model 109a has generated classification labels for the incoming text messages, work item generation module 108b analyzes (step 204) the classified text messages to generate one or more candidate work items based upon the classification (i.e., the disposition and the theme). A work item can also be considered a finding in the context of system 100. Each candidate work item is associated with one or more software applications and a set of skills requirements using the classification. For example, the classification for a particular text message or cluster of messages can indicate that a development effort for a web application login workflow (the theme) was not completed successfully (the disposition) during a recent sprint in an Agile development project. Work item generation module 106b can communicate with project management system 112 to identify one or more software applications that relate to the theme. In a scenario where the classified text messages are exchanged between a plurality of developers, module 106b can determine the employee IDs of these developers and search in database 114 of project management system 112 to determine one or more teams and/or projects to which these developers are assigned. Based upon that information, module 106b can identify one or more software applications related to the teams/projects and generate a candidate work item for those software applications—where the candidate work item involves continuing the development work on the web application login workflow.

Continuing with this example, work item generation module 106b can communicate with project management system 112 to identify a set of skill requirements to include in the candidate work item. Based upon the one or more software applications assigned to the candidate work item, module 106b can identify certain technical skills (e.g., programming language proficiency, certifications, UI/UX design experience, etc.) that are needed or desirable to work on the software applications. In some embodiments, database 114 of project management system stores one or more pre-assigned sets of skill requirements for each software application, and module 106b can retrieve the pre-assigned sets of skill requirements for inclusion into the candidate work item. When the candidate work items are generated, work item generation module 108b can store them in database 110 for retrieval by other components of system 100. As can be appreciated, work item generation module 108b can be configured to generate the candidate work items in a format that conforms to a format used by project management system 112. This enables efficient comparison of the candidate work items to existing work items in project management system 112 as described below.

After the candidate work items are generated by work item generation module 108*b*, server computing device 106 uses work item assignment module 108*c* to filter the candidate work items and determine team members to assign to the remaining candidate work items. First, work item assignment module 108*c* filters (step 206) the candidate work items to remove extraneous work items based upon one or more of a work item backlog or a prioritization of the candidate work items. In some embodiments, for each candidate work item, module 108*c* retrieves from project management system 112 a list of existing work items (that are considered a work item backlog) for the one or more software applications as identified in the candidate work item. Module 108*c* can then compare one or more characteristics of each work item (e.g., software application IDs, scope of work) in the list of existing work items to one or more characteristics of the candidate work item to determine whether there is overlap between the candidate work item and the existing work item. For example, if an existing work item comprises one or more of the same software applications and the same or similar scope of work (e.g., development work on the web application login workflow) as a candidate work item, module 108*c* can remove the candidate work item as extraneous.

In some embodiments, work item assignment module 108*c* can determine a prioritization of the candidate work items based upon, e.g., reputation of the communication session participant that submitted the text message that resulted in generation of the candidate business item, one or more business objectives or goals as stored in project management system 112, and the like. For example, certain software applications or development tasks may be assigned a high priority (e.g., critical bug fixes, security improvements, etc.) while other development tasks may be assigned a low priority. Work item assignment module 108*c* can determine that software application projects for the software applications identified in the candidate work item have been elevated to high priority status in project management system 112, and module 108*c* can re-arrange the candidate work items to place work items that match those software applications at the top of the list. Similarly, for candidate work items associated with software applications that are assigned a low priority in project management system 112, module 108*c* can remove these candidate work items as extraneous. In another example, one or more of the participants in the communication session can have a reputation value (e.g., based upon their role, title, or position, or based upon prior work performance) that is captured by module 108*c*. Based upon the reputation value, module 108*c* can prioritize the candidate work items associated with those participants—i.e., work items for participants with higher reputation values can be moved to a high position in the candidate work item list.

After filtering the candidate work items, work item assignment module 108*c* determines (step 208) one or more team members to assign to each remaining candidate work item by comparing the software applications and/or the set of skills requirements for the candidate work item to a profile for each team member. As can be appreciated, project management system 112 can comprise profile information for each of the team members (e.g., project managers, developers, quality assurance technicians, etc.) in a particular software development organization. The profile information can include, but is not limited to, skills and proficiencies, current project assignments and/or availability, performance and reputation ratings, historical work data, and so forth. Module 108*c* can search the profile information to identify one or more team members that are suitable to assign for completion to each candidate work item. In this context, suitability can be determined according to any number of different criteria, including but not limited to:

A match between the set of skill requirements in the candidate work item and the skills of the team member;

Availability or capacity of the team member to take on the candidate work item (e.g., based upon their existing assignments); or A reputation of the team member generally (e.g., the team member is rated highly for their work product) and/or for a given technical area.

To assign a team member to a candidate work item, work item assignment module 108*c* can update the data structure for the candidate work item with, e.g., the employee ID or other indicia for the team member. It should be appreciated that a plurality of team members with the same or different suitability can be assigned to a given candidate work item.

Task creation module 108*d* receives the candidate work items with assigned team members from work item assignment module 108*c*, and module 108*d* creates (step 210) a task in an issue tracking system (e.g., that is part of project management system 112) for each candidate work item. For example, task creation module 108*d* can create a task in one or more development units (e.g., task board, story, or other functional increment) that is assigned to a specific developer for work and/or completion during an upcoming work period.

When the task creation is completed, notification module 108*e* generates (step 212) a notification for each task for transmission to the assigned team members. In some embodiments, notification module 108*e* identifies a client computing device 102*a*-102*n* associated with each of the assigned team members and transmits a message (e.g., email, text message, pop-up alert, etc.) to the client computing devices 102*a*-102*n* that notifies the member of the task assignment.

In some embodiments, notification module 108*e* advantageously connects the team members assigned to a work item to an existing communication channel and/or creates a new communication channel for the team members. In the example of using a chat messaging platform, notification module 108*e* can add the user to a chat channel associated with the text messages used to create the work item and send the user a message informing them that they are now a member of the communication channel.

Figure 3A:
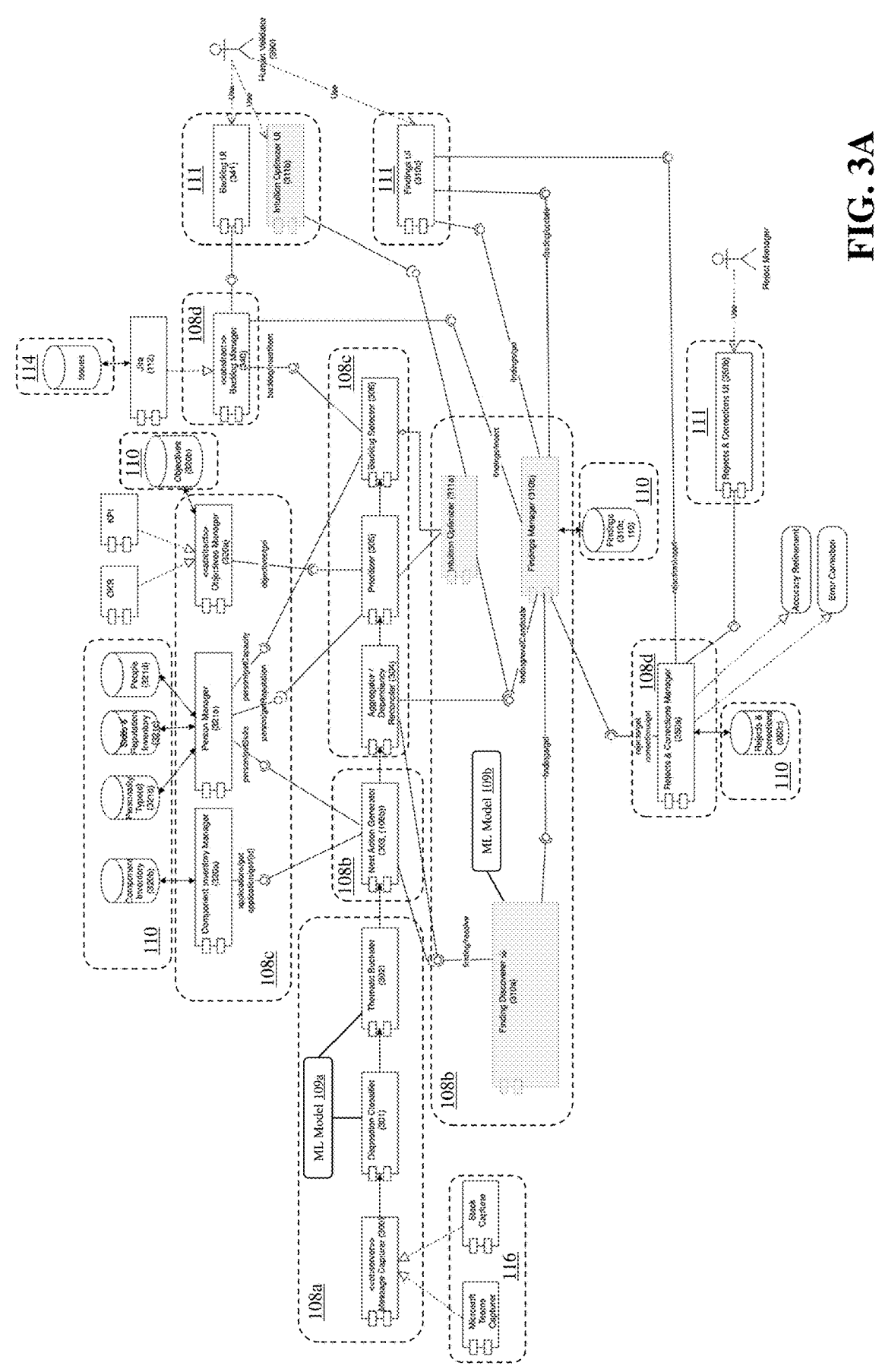
FIG. 3A is a detailed flow diagram of a computerized method in which unstructured computer text is analyzed for extraction of actionable insights in a computing environment.

FIG. 3A is a detailed diagram (represented in Unified Modeling Language (UML) format) of a computerized workflow in which unstructured computer text is analyzed for extraction of actionable insights in a computing environment, using system 100 of FIG. 1 and corresponding to method 200 of FIG. 2. In the workflow depicted in FIG. 3A, the flow of information in the system flows from left-to-right, starting with Message Capturer 300 which collects messages in real-time from, e.g., chat logs generated in one or more communication applications 116 (such as Microsoft® Teams® or Slack™). The captured messages are provided to Disposition Classifier 301 for initial classification of disposition. In some embodiments, Disposition Classifier 301

Disposition Classifier 301 determines each chat message's disposition (e.g., in the example of an Agile methodology, the disposition can be determined as 'what went well,' 'what could have gone better,' 'what can be done about it,' etc.). Disposition Classifier 301 can also perform additional message filtering based on the Reputation data (321c) (e.g., data associated with the person that generated the message) collected as part of the Skills Inventory (321c).

In some embodiments, once Disposition Classifier 301 receives the messages from Message Capturer 300, Disposition Classifier 301 executes ML model 109a to classify each message with a disposition based upon historical message classification data (i.e., identifying whether one or more characteristics of a particular message match a particular pattern). For example, Disposition Classifier 301 can determine a first message is meaningful for work item generation because the first message is classified according to a certain disposition. Disposition Classifier 301 proceeds to transmit the first message to work item generation module 108b for subsequent processing. In another example, Disposition Classifier 301 can exclude a second message from work item generation processing because ML model 109a determines that a pattern of the second message does not match a pattern of historical messages. However, Disposition Classifier 301 can still classify the message according to a specific disposition. In another example Disposition Classifier 301 can exclude a third message from work item generation processing because ML model 109a is unable to classify the message according to the historical message classification data. The classified and filtered messages from Disposition Classifier 301 are provided to Thematic Bucketer 302 which can leverage ML model 109a (or another ML model of module 108a) to generate a second classification of each message based upon a theme. As mentioned previously, the theme assigned to the message can comprise a category that enables the generation and assignment of specific workflow items to individuals. Module 108a provides the messages classified according to disposition and theme to work item generation module 108b for further processing.

Figure 4:
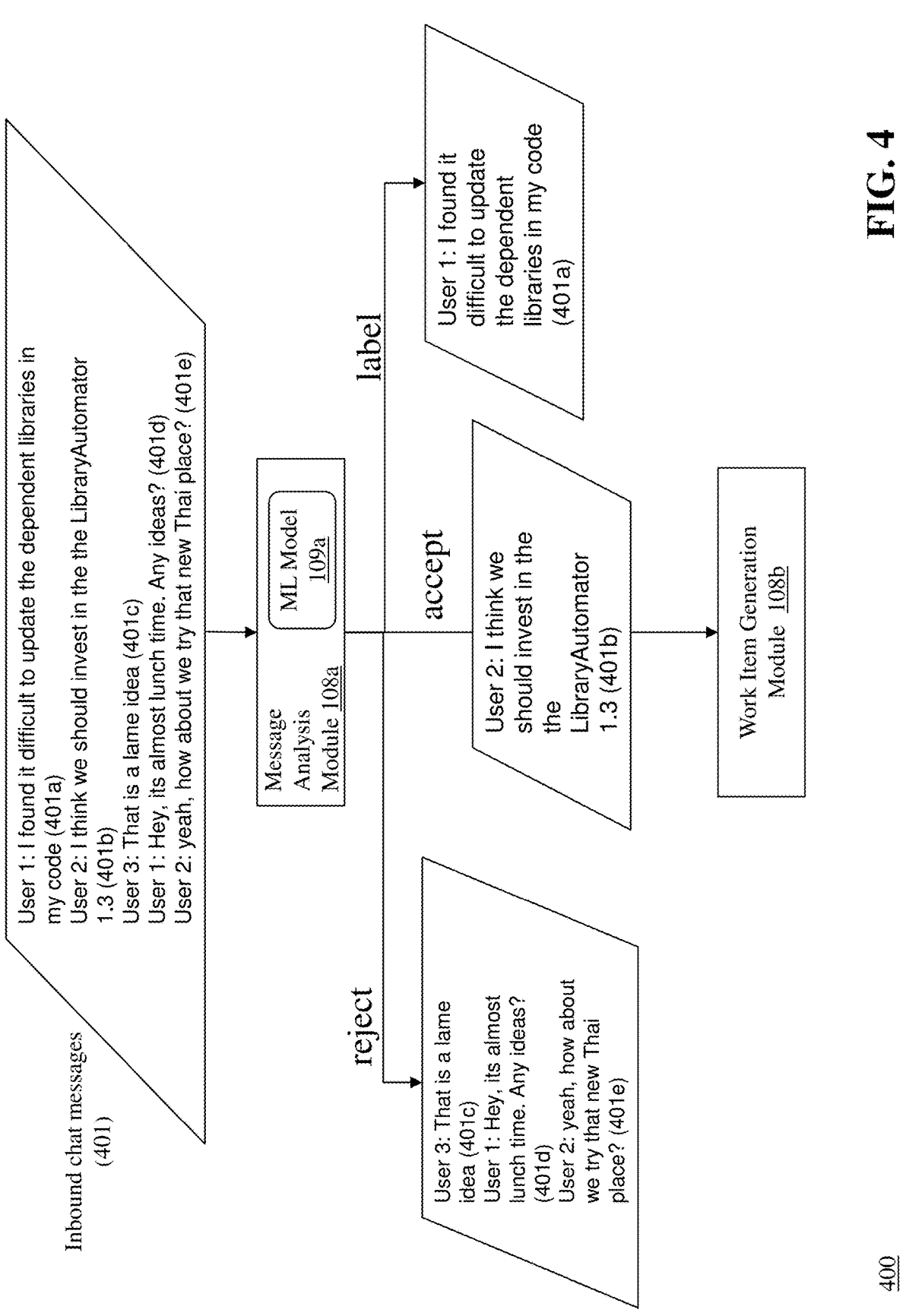
FIG. 4 is a diagram of an exemplary message classification workflow performed by message analysis module.
Figure 5:
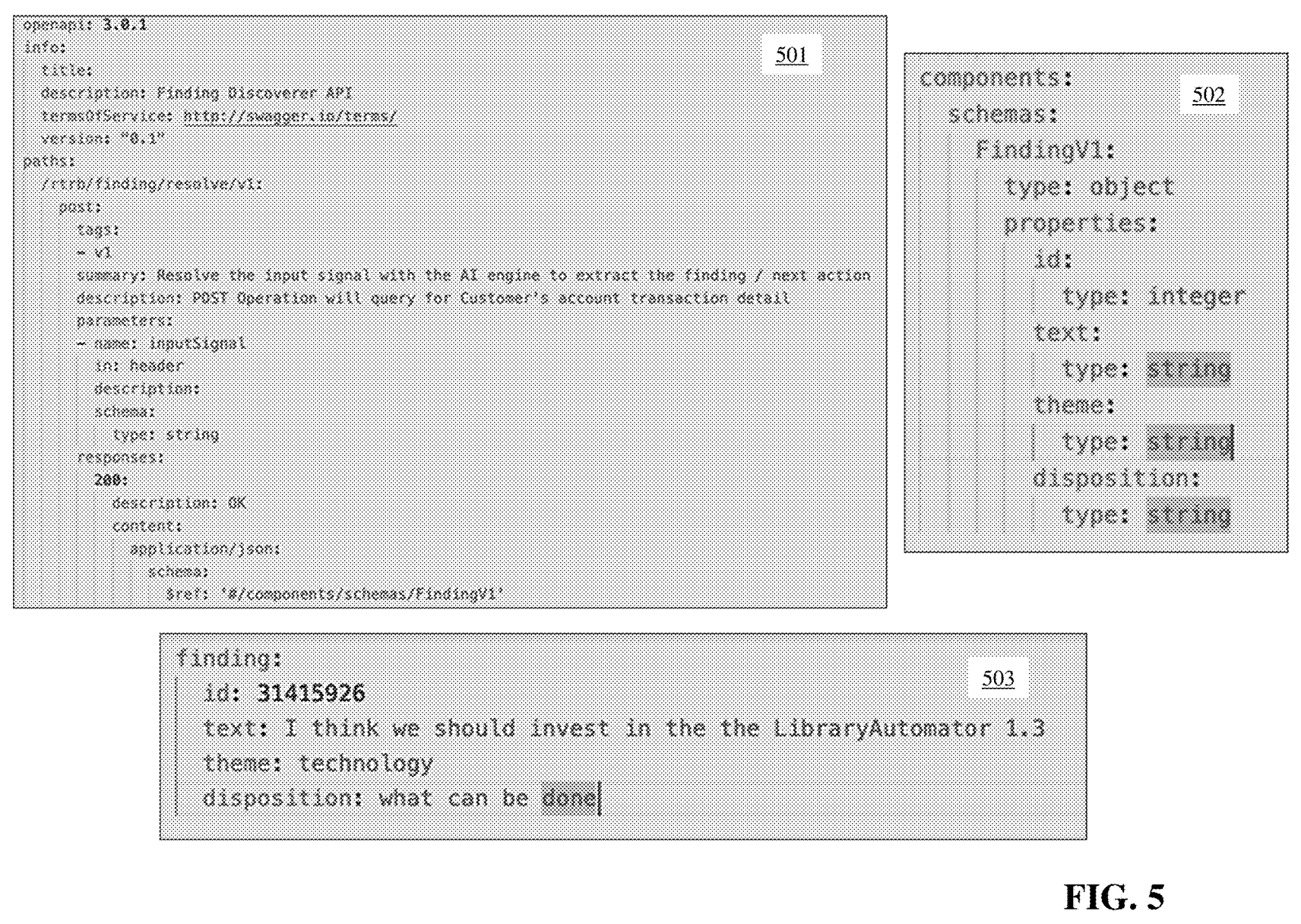

FIG. 4 is a diagram of an exemplary message classification workflow 400 by message analysis module 108a and ML model 109a. As shown in FIG. 4, a plurality of inbound chat messages 401a-401e (collectively, 401) are received by message analysis module 108a from, e.g., one or more chat applications 116. In some embodiments, module 108a captures the chat messages using an API provided by the chat applications 116 that acts as a listening agent. An exemplary API call 501 and 502 (in OpenAPI format) as utilized by module 108a to capture chat messages is shown in FIG. 5, with sample output data shown in 503.

Module 108a rejects certain messages (401c, 401d, 401e) because ML model 109a is unable to classify these messages according to the historical message classification data—e.g., they do not correspond to patterns found in classified messages and thus model 109a cannot determine a disposition or theme for the messages. Module 108a accepts message 401b because the message can be classified according to a disposition and theme and is associated with an actionable insight. Module 108a labels message 401a with a disposition and theme but because the message is not associated with an actionable insight, module 108a does not provide the message to work item generation module 108b.

Next Action Generator 303 utilizes the message data (including disposition and theme classifications) to create candidate work items for assignment to one or more squads or persons, who are tasked with executing on the work items. In some embodiments, when creating candidate work items, Next Action Generator 303 retrieves information from Component Inventory database 320b via Component Inventory Manager 320a. Component Inventor database 320b can comprise a repository of components to which next work item actions are assigned. For example, within the context of software engineering, Component Inventory database 320b can comprise information representing one or more software applications (e.g., applications under development). In other contexts, such as medicine, Component Inventory database 320b can comprise information representing patients or particular drug trials. Next Action Generator 303 can identify one or more particular components from database 320b that need to be remediated (based upon the classified message data) and select those components for generation of candidate work items.

In some embodiments, when creating candidate work items, Next Action Generator 303 retrieves information from Personality Type database 321b, Skills & Reputation Inventory database 321c, and People database 321d via Person Manager 321a. Personality Type database 321b can comprise information relating to one or more personality type profiles (e.g., Myers-Briggs Type Indicator® (MBTI®), Six Thinking Hats®, DiSC®)—as can be appreciated, certain work items may be more efficiently or comprehensively executed by squads or individuals that have selected personality types. In some embodiments, Next Action Generator 303 can utilize one or more machine-learning approaches to generate a personality type for a particular individual based upon the captured messages in conjunction with information from database 321b, as described in S. Ontoum and J. H. Chan, "Personality Type Based on Myers-Briggs Type Indicator with Text Posting Style by using Traditional and Deep Learning," arXiv: 2201.08717v1 [cs.CL], Jan. 21, 2022, which is incorporated herein by reference. Skills & Reputation Inventory database 321c can comprise information relating to one or more technical skills (e.g., programming language proficiency, technical certifications, prior experience, etc.) and reputation (e.g., performance indicators, job ratings, colleague review criteria) of individuals and/or squads that may be informative in generating and assigning work items. People database 321d can comprise information pertaining to employees (e.g., developers, managers, squad leaders, etc.) that may be eligible for receiving work items for execution. In some embodiments, Person Manager 321a is configured to aggregate/transform data from each of databases 321b, 321c, and 321d for consumption by Next Action Generator 303. For example, Person Manager 321a can generate an inventory of employee/person profiles that each comprise the person's skills, new work capacity (e.g., measured in hours), reputation, and personality type. Instead of accessing each database 321a, 321b, 321c individually, Next Action Generator 303 can request certain profile information from Person Manager 321a when generating candidate work items.

Figure 3B:
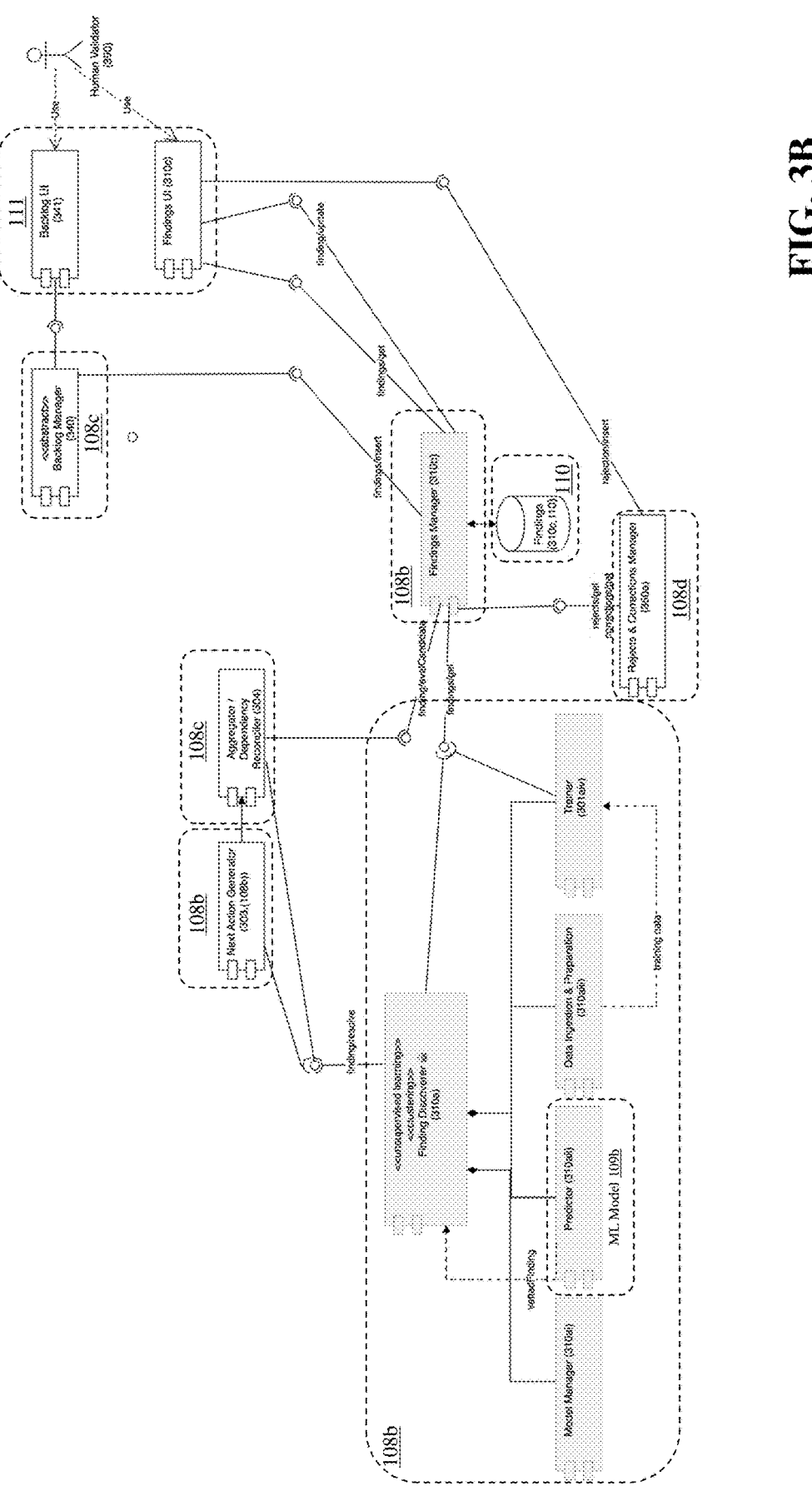
FIG. 3B depicts a detailed view of Finding Discoverer of FIG. 3A.

An important part of work item generation is the deployment of Finding Discoverer 310a, Findings Manager 310b, and Intuition Optimizer 311a, which captures input signals from Next Action Generator 303 and uses a machine learning-driven engine to extract actionable insights (also referred to as 'findings') that can be converted into work items by Next Action Generator 303. FIG. 3B provides a detailed view of certain machine-learning based components of FIG. 3A, including Finding Discoverer 310a and its sub-modules Model Manager 310ai, Predictor 310aii (which is incorporated in ML model 109b), Data Ingestion & Preparation 310aiii, and Trainer 310aiv. As shown in FIG. 3B, Finding Discoverer 310a receives input signals from Next Action Generator 303, including but not limited to data relating to captured messages and associated disposition and theme classification.

Finding Discoverer 310a is coupled to a plurality of sub-modules: Model Manager 310ai, Predictor 310aii, Data Ingestion & Preparation 310aiii, and Trainer 310aiv. These sub-modules operate to train and re-train ML model 109b on incoming signal data to generate predictions of whether chat messages or other unstructured text (as classified by message analysis module 108a and ML model 109) can be further classified as actionable findings used to generate work items. As can be appreciated, Finding Discoverer 310a can utilize unsupervised learning and clustering algorithm(s) (e.g., K-means clustering) in ML model 109b for generating the predictions of actionable findings. One example of an unsupervised learning algorithm that can be used in ML model 109b is described in K. P. Sinaga and M. Yang, "Unsupervised K-Means Clustering Algorithm," IEEE Access, Vol. 8, published Apr. 20, 2020, which is incorporated herein by reference.

Specific functionality for each of the submodules is described below. Model Manager 310ai maintains the resulting model (ML model 109b) that is executed by Finding Discoverer 310a for generating actionable findings. Predictor 310aii is a component of ML model 109b which executes unsupervised learning and clustering algorithm(s) to determine whether or not a signal provided by Next Action Generator 303 is predicted to be classified as a finding and if not, what other classification the signal belongs in. Data Ingestion & Preparation 310aiii performs data cleansing and feature engineering (e.g., dimensionality reduction, feature extraction, vector generation, etc.) tasks on the incoming signal data to convert the data into a form that is interpretable by Trainer 310aiv to train and/or re-train ML model 109. Trainer 310aiv conducts periodic training of ML model 109b with subset(s) of existing findings; Trainer 310aiv relies on the data available from the Findings Manager (310b) for use as training data when updating ML model 109b.

Upon executing ML model 109b on incoming signal data, Finding Discoverer 310a predicts one or more actionable findings that correspond to the chat message data and related disposition/theme classifications. Finding Discoverer 310a provides the actionable findings to Findings Manager 310b which can store the findings in Findings database 310c for retrieval and analysis by client computing devices 102a-102n via Findings UI 310c generated from web application interface 111. In some embodiments, a user at client computing device 102a-102n can analyze findings generated by Finding Discoverer 310a and, e.g., make changes to or provide feedback on the findings (such as rejecting one or more findings).

Turning back to FIG. 3A, once the messages are classified with a disposition and a theme, and one or more actionable findings are generated by Next Action Generator 303, the Generator 303 creates candidate work items based upon the actionable findings. Generally, a candidate work item comprises a task incorporating the finding(s) for execution/completion by one or more assigned individuals (e.g., developers, quality assurance staff, etc.). Aggregator/Dependency Reconciler 304 receives the candidate work items from Generator 303 and coordinates with Findings Manager 310b and Backlog Manager 340 to evaluate whether the candidate work item (and/or classified actionable finding) is already included in a work item backlog. Generally, Backlog Manager 340 is coupled to project management system 112 (e.g., Jira™ issue tracking platform) which provides a repository of pending, already assigned work items (i.e., a backlog) and completed work items. Jira™ is an issue tracking application supporting a number of flavors of Agile practices. Aggregator/Dependency Reconciler 304 compares the backlog work items from Backlog Manager 340 to the candidate work items (e.g., using one or more similarity metrics) to determine whether there is overlap between the backlog work items and the candidate work items. For example, Aggregator/Dependency Reconciler 304 can compare one or more attributes of the candidate work item (e.g., type, name, description, application, etc.) to attributes of the backlog work items and identify items with the same or similar attributes. Aggregator/Dependency Reconciler 304 can filter out each candidate work item that has overlap based upon, e.g., a degree or threshold of overlap (100%, 75%, and so forth). In some embodiments, Aggregator/Dependency Reconciler 304 can compare one or more actionable findings that are associated with the candidate work items to existing or known findings from Findings Manager 310b (as stored in Findings database 310c) to identify whether there is any overlap. If so, Aggregator/Dependency Reconciler 304 can filter out each overlapping actionable finding. In some embodiments, Aggregator/Dependency Reconciler 304 also performs grouping of findings for storage in Findings database 310c for a more consolidated or aggregated view of findings.

Aggregator/Dependency Reconciler 304 transmits the remaining candidate work items to Prioritizer 305 and Intuition Optimizer 311a. Generally, Prioritizer 305 assesses each candidate work item (and/or actionable finding) to determine how the work item aligns to defined goals, objectives and key results (OKR), key performance indicators (KPIs), or other requirements of an organization. For example, a company may want to prioritize development activity that remediates and/or enhances the security of a software application. The company can generate one or more objectives based upon this priority and store the objectives in Objectives database 320b. Objectives Manager 320a can provide objectives from database 320b (and/or objectives from external data sources such as OKR or KPI) to Prioritizer 305 for evaluation of the candidate work items. In some embodiments, Prioritizer 305 can determine that one or more candidate work items align closely with a high-priority objective of the organization and assign a corresponding value or ranking to the candidate work items. As an example, work items that match important objectives can be assigned a higher value or ranking than work items that do not match important objectives—indicating that these work items should be assigned and executed before other, lower-ranking work items.

Prioritizer 305 can provide the values/rankings for work items to Intuition Optimizer 311a, which also receives the candidate work items and related actionable findings from Aggregator/Dependency Reconciler 304. Intuition Optimizer 311a assesses the validity of the candidate work items and/or actionable findings and assigns a score (e.g., 0 to 4) that corresponds to the validity. In some embodiments, Intuition Optimizer 311a incorporates data provided by Person Manager 321a (e.g., reputation) to determine whether a candidate work item has been assigned to an optimal squad/person for handling the task. For example, a squad/person may have a positive reputation for efficiently handling specific types of work items. Intuition Optimizer 311a can confirm that the squad/person assigned to a candidate work item has a positive reputation for the work item type and validates the candidate work item. In some embodiments, client computing devices 102a-102n can enable users to analyze the validity scores assigned by Intuition Optimizer 311a via Intuition Optimizer UI 311b generated from web application interface 111. In some embodiments, a user at client computing device 102a-102n can review the validity of candidate work items generated by Intuition Optimizer 311*a* and, e.g., make changes to or provide feedback on the candidate work items.

Once the candidate work items have been prioritized and validated, Backlog Selector 306 routes the candidate work items to the assigned squad/person. In some embodiments. Backlog Selector 306 captures squad/person capacity data via Person Manager 321*a* to assess whether the assigned squad/person has capacity to execute the work item. Backlog Selector 306 can determine an alternate squad/person to which the work item should be assigned in the event that the original squad/person does not have capacity to handle the work item (e.g., due to information obtained from Backlog Manager 340.

Figure 6:
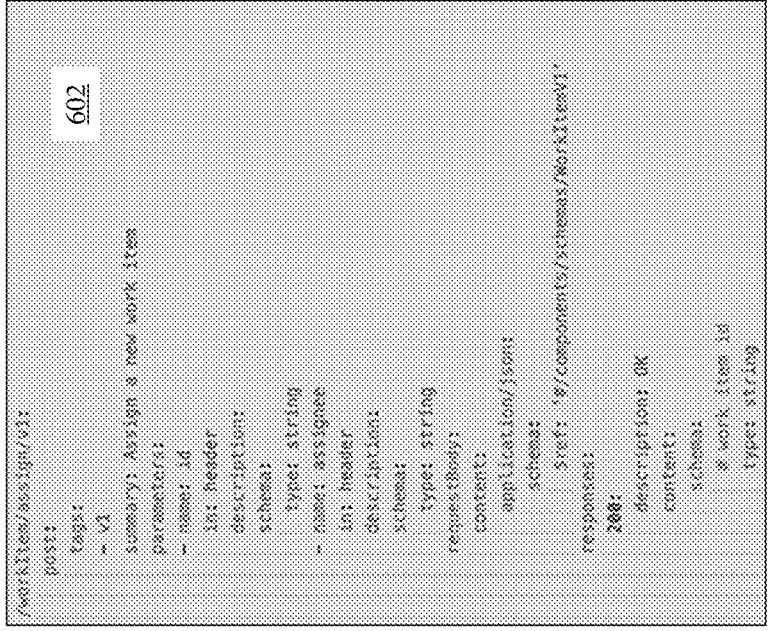
FIG. 6 is a diagram of exemplary API calls for insertion, assignment, and creation of candidate work items in project management system.
Figure 7:
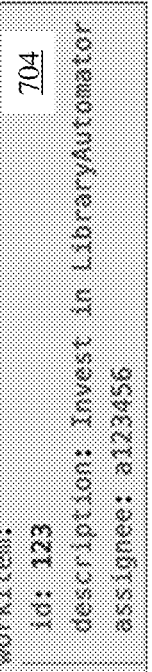
FIG. 7 is a diagram of an exemplary work item including an issue as stored in project management system and a corresponding data payload of the work item.

Backlog Selector 306 communicates with Backlog Manager 340 to convert the assigned work item into a format compatible with, e.g., project management system 112 (e.g., a Jira™ issue) for storage and tracking of the work item in the system 112. FIG. 6 is a diagram of exemplary API calls for insertion 601, assignment 602, and creation 603 of candidate work items in project management system 112. FIG. 7 is a diagram of an exemplary work item 700 including an issue 702 as stored in the project management system 112 and a corresponding data payload 704 of the work item as generated by Next Action Generator 303. After the work item is assigned and stored in project management system 112 by task creation module 108*d*, notification module 108*e* transmits a notification of the assignment to one or more client computing devices 102*a*-102*n* associated with those assigned to execute the work item.

In some embodiments, findings or work items may be rejected or flagged for correction by, e.g., one or more users of client computing devices 102*a*-102*n*. For example, a user may review actionable findings generated by Findings Discoverer 310*a* of module 108*b* (via Findings UI 310*c* generated by web application interface 111) and identify one or more findings that should be rejected or flagged for correction due to, e.g., misalignment with objectives, missing data, incorrect assignments, etc. Rejects & Corrections Manager 350*a* can receive the rejected/flagged work items or findings from Findings Manager 310*b* and/or Findings UI 310*c* and store the items in Rejects & Corrections database 350*c*. Another user at a client computing device 102*a*-102*n* can access Rejects & Corrections UI 350*b* to review the rejected/ flagged work items and provide refinements or error corrections to the work items.

While the methods and systems described herein are focused on generating work items and tasks for a software development project through the analysis and classification of text messages, it should be appreciated that the methods and systems are equally applicable to a variety of different domains and use cases. In just some examples, system 100 can be configured to analyze communication session messages to generate actionable insights in the following domains:

Healthcare—Capturing message exchanges (including, but not limited to, live transcription of audio conversations) between physicians and patients during consultations, even in emergency situations. Analysis of such message exchanges can provide valuable insights and action items with respect to medical concerns, symptoms, treatment plans, and outcomes of past consultation that can be used to automatically schedule future appointments, new prescriptions or changes to existing prescriptions, referrals to qualified specialists, and so forth.

Financial Services—Capturing real-time dialog between individual traders and/or clients and advisors during consultations. Analysis of such message exchanges can enable rapid adjustment of existing financial portfolio information, marketing or selection of additional products that relate to client objectives, generation of specifically tailored investment advice, and confirmation of compliance with governmental regulations and guidelines.

Emergency Incident Response—Capturing real-time communications between first responders and central coordination staff or other decision-makers during emergency incidents. Analysis of such message exchanges can provide for the generation of responsive actions that can dynamically adjust to changing conditions reflected in the message exchange.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random-access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above-described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above-described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system in which unstructured computer text is analyzed for extraction of actionable insights in a computing environment, the system comprising:

a server computing device having a memory for storing computer-executable instructions and a processor that executes the computer-executable instructions to:

execute a first machine learning classification model on a corpus of computer data messages comprising the unstructured computer messages exchanged between a plurality of users to classify each computer data message according to a disposition, wherein the disposition relates to an outcome of a task or an action item that is associated with the computer data message, the first machine learning classification model trained on historical computer data message classification data;

execute a second machine learning classification model on the classified corpus of computer data messages to further classify each of the classified computer data messages of the corpus according to a theme, wherein the theme relates to a subject area or topic associated with the computer data message;

execute a third machine learning model to generate an actionable finding based on an analysis of each corresponding computer data message, disposition, and theme, wherein one or more actionable findings are used to generate one or more candidate work items each candidate work item associated with one or more software applications and a set of skills requirements, and wherein the third machine learning model is periodically retrained based on previously generated actionable findings;

filter the one or more candidate work items to remove extraneous work items based upon one or more of a work item backlog or a prioritization of the one or more candidate work items;

determine one or more team members to assign to each remaining candidate work item by comparing the one or more software applications and the set of skills requirements for the candidate work item to a profile for each team member;

execute a task creation module configured to create a task in an issue tracking system for each remaining candidate work item, the task including the assigned team members; and execute a notification module configured to generate a notification for each task for transmission to the assigned team members, wherein the server computing device generates an ongoing chat session that is associated with each task, and the server computing device adds the assigned team members to the ongoing chat session via the notification.

2. The system of claim 1, wherein the corpus of computer data messages is received in real time from one or more ongoing text chat sessions.

3. The system of claim 2, wherein when analyzing the classified computer data messages, the computer-readable instructions to:

determine one or more of a sentiment associated with the text computer data message or a semantic context associated with the computer data message.

4. The system of claim 3, wherein when determining one or more team members to assign to each remaining candidate work item, the computer-executable instructions to: select one or more team members based upon the sentiment associated with the computer data message or the semantic context associated with the computer data message.

5. The system of claim 1, wherein the server computing device escalates at least one of the ongoing chat sessions to the determined team members.

6. The system of claim 1, wherein determining one or more team members to assign to each remaining candidate work item further comprises identifying one or more team members with a capacity to handle one or more candidate work items.

7. The system of claim 1, wherein when filtering the candidate work items to remove extraneous work items based upon a work item backlog, the computer-readable instructions to:

determine that one or more of the candidate work items is already included in the work item backlog; and remove the determined candidate work items as extraneous work items.

8. The system of claim 1, wherein when filtering the candidate work items to remove extraneous work items based upon a prioritization of the candidate work items, the computer-executable instructions to:

determine a reputation associated with a chat participant that submitted each computer data message; and prioritize the candidate work items according to the reputation associated with the chat participant that submitted each computer data messages which generated the candidate work items.

9. The system of claim 1, wherein the server computing device transmits the notification for each task to a computing device associated with each of the assigned team members.

10. A computerized method in which unstructured computer text is analyzed for extraction of actionable insights in a computing environment, the method comprising:

executing, by a server computing device, a first machine learning classification model on a corpus of computer data messages comprising the unstructured computer text messages between a plurality of users to classify each computer data message according to a disposition, wherein the disposition relates to an outcome of a task or an action item that is associated with the computer data message, the first machine learning classification model trained on historical computer data message classification data;

executing, by a server computing device, a second machine learning classification model on the classified corpus of computer data messages to further classify each of the classified computer data messages of the corpus according to a theme, wherein the theme relates to a subject area or topic associated with the computer data message;

executing, by a server computing device, a third machine learning model to generate an actionable finding based on an analysis of each corresponding computer data message, disposition, and theme, wherein one or more actionable findings are used to generate one or more candidate work items based upon the classification, each candidate work item associated with one or more software applications and a set of skills requirements, and wherein the third machine learning model is periodically retrained based on previously generated actionable findings;

filtering, by the server computing device, the one or more candidate work items to remove extraneous work items based upon one or more of a work item backlog or a prioritization of the one or more candidate work items;

determining, by the server computing device, one or more team members to assign to each remaining candidate work item by comparing the one or more software applications and the set of skills requirements for the candidate work item to a profile for each team member;

creating, by a task creation module of the server computing device, a task in an issue tracking system for each remaining candidate work item, the task including the assigned team members; and generating, by a notification module of the server computing device, a notification for each task for transmission to the assigned team members, wherein the server computing device generates an ongoing chat session that is associated with each task, and the server adds the assigned team members to the ongoing chat session via the notification.

11. The method of claim 10, wherein the corpus of computer data messages is received in real time from one or more ongoing text chat sessions.

12. The method of claim 11, wherein analyzing the classified computer data messages comprises:

determining one or more of a sentiment associated with the computer data message or a semantic context associated with the computer data message.

13. The method of claim 12, wherein determining one or more team members to assign to each remaining candidate work item further comprises selecting one or more team members based upon the sentiment associated with the computer data message or the semantic context associated with the computer data message.

14. The method of claim 10, further comprising escalating, by the server computing device, at least one of the ongoing chat sessions to the determined team members.

15. The method of claim 10, wherein determining one or more team members to assign to each remaining candidate work item further comprises identifying one or more team members with a capacity to handle one or more candidate work items.

16. The method of claim 10, wherein filtering the candidate work items to remove extraneous work items based upon a work item backlog comprises:

determining that one or more of the candidate work items is already included in the work item backlog; and removing the determined candidate work items as extraneous work items.

17. The method of claim 10, wherein filtering the candidate work items to remove extraneous work items based upon a prioritization of the candidate work items comprises:

determining a reputation associated with a chat participant that submitted each computer data message; and prioritizing the candidate work items according to the reputation associated with the chat participant that submitted each computer data messages which generated the candidate work items.

18. The method of claim 10, wherein the server computing device transmits the notification for each task to a computing device associated with each of the assigned team members.

\*   \*   \*   \*   \*